(12) United States Patent
Ballester

(10) Patent No.: US 6,722,465 B2
(45) Date of Patent: Apr. 20, 2004

(54) STEERING MECHANISM FOR AN AUTOMOTIVE VEHICLE

(75) Inventor: Adrian Jose Ballester, Buenes Aires (AR)

(73) Assignee: Visteon Global Technologies, Inc, Dearborn, MI (US)

(*) Notice: Subject to any disclaimer, the term of this patent is extended or adjusted under 35 U.S.C. 154(b) by 19 days.

(21) Appl. No.: 09/900,770

(22) Filed: Jul. 6, 2001

(65) Prior Publication Data
US 2003/0006086 A1 Jan. 9, 2003

(51) Int. Cl.[7] .................................................. B62D 3/12
(52) U.S. Cl. ............................................... 180/428; 74/422
(58) Field of Search ........................... 180/428, 427, 180/400; 74/422, 498, 493; 280/93.514

(56) References Cited

U.S. PATENT DOCUMENTS

| | | | |
|---|---|---|---|
| 3,753,375 A | * 8/1973 | Colletti | ............................ 74/498 |
| 3,831,697 A | * 8/1974 | Wahlmark | ................. 180/79.2 |
| 4,144,948 A | 3/1979 | Sergay | |
| 4,218,933 A | * 8/1980 | Allen et al. | ...................... 74/422 |
| 4,527,465 A | * 7/1985 | Yoshida et al. | ................ 92/136 |
| 4,721,175 A | * 1/1988 | Butler | .......................... 180/148 |
| 4,724,714 A | 2/1988 | Iwasaki et al. | |
| 4,809,806 A | 3/1989 | Pietrzak et al. | |
| 4,815,329 A | 3/1989 | Ansgar et al. | |
| 4,939,947 A | 7/1990 | Toyoshima et al. | |
| 5,070,958 A | 12/1991 | Goodrich, Jr. et al. | |
| 5,213,174 A | 5/1993 | Adams | |
| 5,251,717 A | * 10/1993 | Klosterhaus | ................ 180/148 |
| 5,482,132 A | 1/1996 | Birsching | |
| 5,579,861 A | 12/1996 | Ballester | |
| 5,651,424 A | 7/1997 | Joerg et al. | |
| 5,660,078 A | 8/1997 | Phillips | |
| 5,694,810 A | * 12/1997 | Iwasa et al. | ..................... 74/422 |
| 5,735,365 A | 4/1998 | Sako et al. | |
| 5,842,537 A | * 12/1998 | Pfeifer | ......................... 180/428 |
| 6,193,008 B1 | 2/2001 | Hafermalz | |
| 6,283,244 B1 | * 9/2001 | Ballester | ..................... 180/428 |
| 6,439,337 B1 | 8/2002 | Ballester | |

FOREIGN PATENT DOCUMENTS

| | | |
|---|---|---|
| DE | 42 20 417 A1 | 12/1993 |
| EP | 0 906 862 A2 | 4/1999 |
| EP | 1 129 925 A1 | 9/2001 |
| GB | 1 581 227 | 12/1980 |
| GB | 2 183 778 A | 6/1987 |

* cited by examiner

*Primary Examiner*—Lesley D. Morris
*Assistant Examiner*—Tony Winner
(74) *Attorney, Agent, or Firm*—John R. Kajander, Esq.

(57) ABSTRACT

A steering system (10) has a rack housing (12) formed of a first tube (14) and a pinion housing (16) formed of a second tube (18). A first opening (31) is provided in the first tube (14) and a second opening (33) is formed in the second tube (18). The first opening (31) and second opening (33) expose a respective fillet (32), (34). The relative position of first opening (31) and second opening (33) determine the position of the first tube (14) with respect to the second tube (18). A first bushing (40) and a second bushing (42) are used to support a rack (36) within first tube (14). A pinion shaft (60) positioned within second tube (18) has a pinion gear (62) for coupling with rack (36). Preferably a first bracket (26) and second bracket (28) are positioned on first tube (14) adjacent to first bushing (40) and second bushing (42), respectively.

16 Claims, 2 Drawing Sheets

STEERING MECHANISM FOR AN AUTOMOTIVE VEHICLE

TECHNICAL FIELD

The present invention relates generally to steering systems for automotive vehicles. More specifically, the present invention relates to power and manual rack and pinion steering systems for automotive vehicles.

BACKGROUND OF THE INVENTION

Rack and pinion power steering systems are commonly used in automotive vehicles. To prevent excessive noise during operation of the steering system, the pinion should be oriented in a desired direction so that upon rotation of the pinion, the rack moves in the desired manner. During operation that position should be maintained. If proper positioning is not maintained, undesirable noise may be generated.

Commonly, the rack and pinion housings are formed together in a single casting. The castings are typically formed in a foundry. One drawback to such systems is that steering systems are typically manufactured for use in a variety of vehicles. Each vehicle, however, may require a slightly different variation in the position of the rack with respect to the pinion. Therefore, new molds and new castings must be formed. Another drawback to this process is that it is very expensive to implement the additional mold to form the housing.

Also in conventional power steering systems, the pinion is positioned at one end of the rack while the other end of the rack is supported by a bushing. One problem with this configuration is that the unsupported end may cause mechanical noise due to the lack of support of the rack.

It would therefore be desirable to provide a power steering system that allows flexibility in manufacturing by allowing different positions of the rack with respect to the pinion without expensive processing.

SUMMARY OF THE INVENTION

It is therefore one object of the invention to provide a power steering system that is easily manufacturable and allows easy mechanical alignment of the rack with respect to the pinion. It is a further object of the invention to provide a steering system that reduces noise during operation.

In one aspect of the invention, a steering system comprises a first tube having a first end and a second end and a first opening positioned between the first end and the second end. A second tube has a second opening alignable with the first opening. The first tube and second tube are coupled together at the first opening and the second opening. A rack is positioned within the first tube and a pinion is positioned within the second tube. A first bushing is positioned within the first tube adjacent to the first end. A second bushing is positioned within the first tube adjacent to the second end. The first and second bushings support the rack within the first tube.

In a further aspect of the invention, a method of forming a steering system comprises the steps of:
- cutting a first opening in a first tube between a first end and a second end to expose a first fillet;
- cutting a second opening in a first tube to expose a second fillet;
- positioning the first fillet against the second fillet so that the first tube is positioned in a predetermined orientation with respect to the second tube;
- fixedly fastening the first fillet and the second fillet;
- placing a rack within the first tube;
- placing a pinion within the second tube; and
- aligning the pinion with the rack.

One advantage of the invention is that a good return force may be provided by the present invention. Another advantage of the invention is that the configuration may be made for both manual and power assisted steering systems. Yet another advantage of the invention is that the system may be easily modified to provide different angles between the rack and pinion without having to form complex casting molds.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
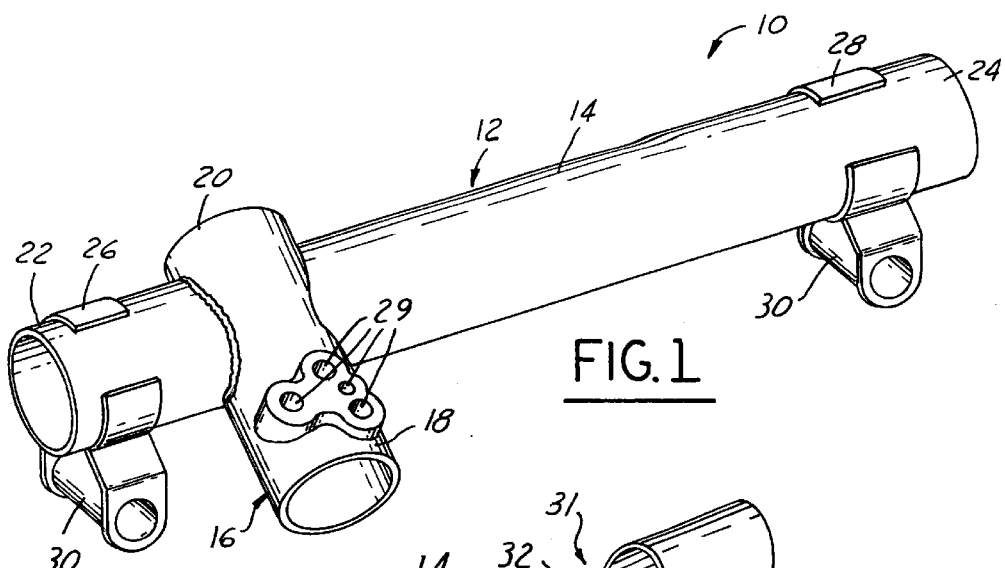
FIG. 1 is a perspective view of a steering system according to the present invention.

In the following figures the same reference numerals are used to identify the same components in the various views. The present invention is applicable to both power steering systems and manual steering systems. The various shapes and orientations of the components are meant for illustrated purposes and are not meant to limit the scope of the invention.

Referring now to FIG. 1, a perspective view of a steering system 10 is illustrated having a rack housing 12 that is formed of a first tube 14. The steering system 10 also has a pinion housing 16 formed of a second tube 18. Preferably, first tube 14 and second tube 18 are formed of a steel or durable plastic material that are welded together at joint 20. Tubes 104 and 18 are preferably circular in cross section. However, other shape tubes may be used and include but are not limited to square, oval or rectangular.

First tube 14 has a first end 22 and a second end 24. The second tube 18 is located between first end 22 and second end 24. A first bracket 26 is secured to first end 22 for supporting steering system 10 on automotive vehicle (a portion of which is shown at 30). A second bracket 28 is located at second end 24 and is used for coupling second bracket 28 to the portion 30 of the automotive vehicle.

Second tube 18 in a power assisted steering configuration may also house a hydraulic valve therein. As illustrated, fluid ports 29 are provided through second tube 18 to provide fluid communication with the valve therein. For manual steering systems, the fluid ports 29 may be sealed or not provided at all. Fluid port 29 may be a separate plug or may be integrally molded into second tube 18.

Figure 2:
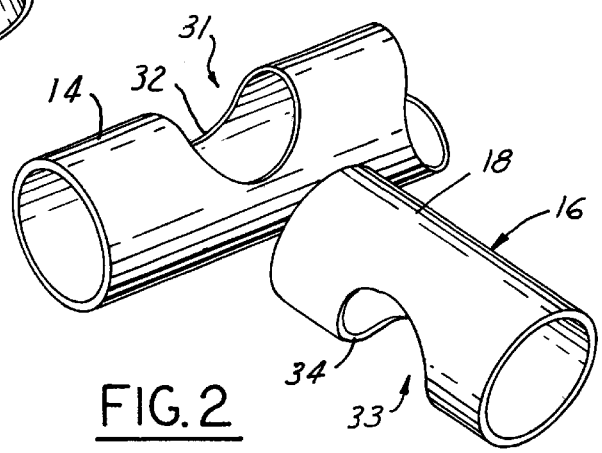
FIG. 2 is a perspective view of a first tube and second tube of the steering system.

Referring now to FIG. 2, first tube 14 is shown separated from second tube 18. Each tube has a respective opening 31, 33 that exposes a respective fillet 32, 34. Fillets 32, 34 are cut in their respective tubes prior to assembly. The position of fillet 32 with respect to fillet 34 dictates the angle for assembly of the first tube 14 with respect to the second tube 18. Thus, by changing the orientation of the fillets 32, 34 the relative position of the first tube and second tube may be changed. Advantageously, variations in the cutting position may be used for different automotive vehicles. The fillets 32, 34 are notched contours which are semi-circular in profile that extend into the tubes 14, 18. As illustrated, second tube 18 has a diameter less than first tube 14. This provides support for fillet 34 within fillet 32 of first tube 14.

Figure 3:
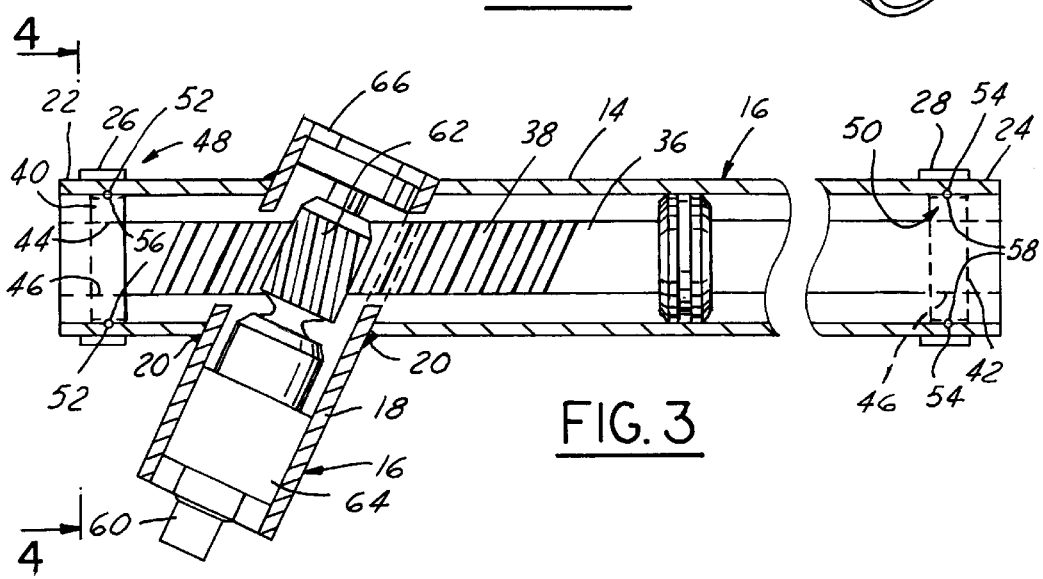
FIG. 3 is a longitudinal cross section of a steering system according to the present invention.
Figure 4:
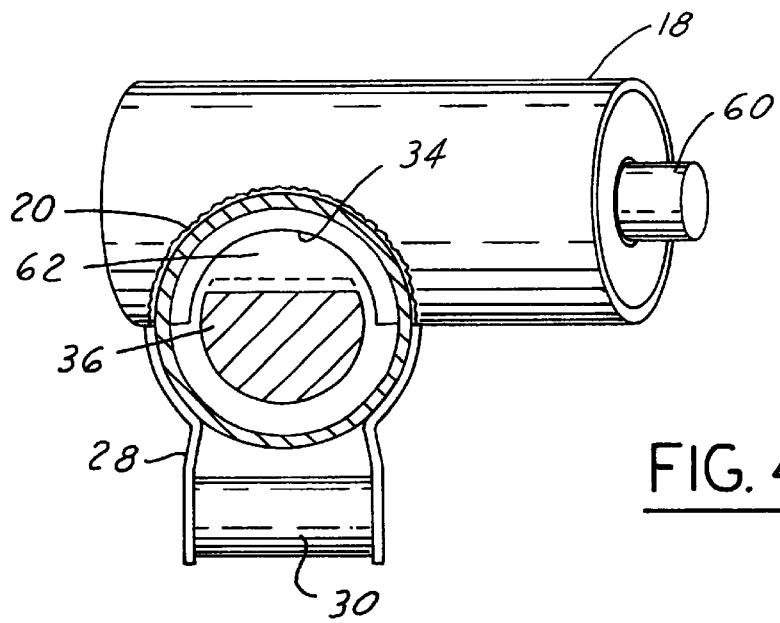
FIG. 4 is a lateral cross sectional view of the steering system according to the present invention.

Referring now to FIGS. 3 and 4, a rack 36 is illustrated positioned within first tube 14. Rack 36 is formed in a conventional manner and has a plurality of rack teeth 38 formed thereon. The rack 36 is ultimately coupled to the wheels of the vehicle for movement thereof. Rack 36 preferably has a generally circular cross-sectional area. Rack 36 is supported by a first bushing 40 and a second bushing 42. Bushings 40, 42 are preferably formed of a compliant material so that forces on the rack may be absorbed by the bushings. Each bushing 40, 42 has a respective opening 44, 46 through which rack 36 extends. Preferably, bushings 42, 44 are positioned adjacent to the respective first bracket 26 and second bracket 28 within first tube 14. A first support 48 and a second support 50 are located adjacent to respective bushings 42, 44 for maintaining the position of the respective bushings 42, 44 within first tube 14.

In this embodiment support 48 and support 50 comprise a notch 52 and notch 54 respectively. Bushings 42,44 have a pin or plurality of pins 56,58, respectively. Pins 56,58 engage notches 52,54 to hold bushings 42,44 in place.

Pinion housing 16 has a pinion shaft 60 positioned therein. Pinion shaft 60 has a pinion gear 62 that is used to engage rack teeth 38. Pinion shaft 60 may also have a valve member 64 rotatably coupled thereto in a power assisted steering configuration. Pinion shaft 60 is ultimately coupled to the hand wheel (not shown) of the automotive vehicle. Thus, as the hand wheel is turned, the pinion shaft 60 rotates which in turn causes the rack 36 to translate along the longitudinal axis of first tube 14.

Second tube 18 has an end cap 66 that receives the end of pinion shaft 60. The pinion shaft 60 engages end cap 66 that has a bearing therein for rotational movement. In operation, a desired orientation of the rack with respect to the pinion is determined for the particular vehicle for which the steering system 10 will be used. The cutting of the first opening and the second opening to expose the first fillet and second fillet may be an easily automated process. The first fillet of the first tube is positioned against the second fillet of the second tube in the predetermined orientation. The first fillet and the second fillet are fixably attached together by welding or other securing means suitable for the materials from which first tube 14 and second tube 18 are composed. The pinion shaft 60 is positioned within the second tube 18 and the rack 36 is positioned within the first tube to engage the pinion gear 62. Bushings 40, 42 are used to urge and maintain the rack teeth 38 against pinion gear 62 during operation. First support 48 and second support 60 are used to maintain the bushings 40, 42 in place.

To fasten steering system 10 to the vehicle, a first bracket 26 and a second bracket 28 are located at opposite ends of the first tube 14. Preferably, the first bracket 26 and the second bracket 28 are located on the exterior of the first tube 14 adjacent to the first bushing and second bushing.

Figure 5:
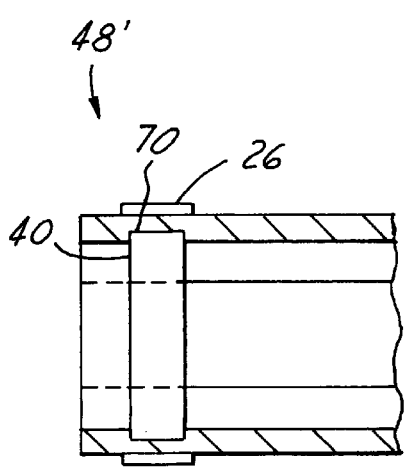
FIG. 5 is a longitudinal cross section of a first alternative support according to the present invention.

Referring now to FIG. 5, an alternative support 48' is illustrated. In this embodiment, a channel 70 is formed within tube 14. Bushing 40 is compressed upon insertion and expands when aligned with channel 70.

Figure 6:
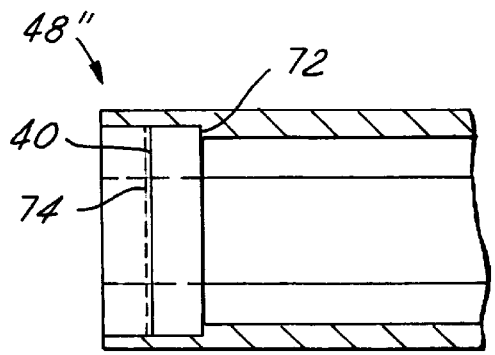
FIG. 6 is a second embodiment of a first alternative support according to the present invention.

Referring now to FIG. 6, an alternative support 48" is illustrated. In this embodiment, a step 72 is formed within tube 14. Bushing 40 is inserted into tube 14 and is retained in place by a clip 74. Clip 74 may, for example, be a seeger-type clip.

While particular embodiments of the invention have been shown and described, numerous variations and alternate embodiments will occur to those skilled in the art. Accordingly, it is intended that the invention be limited only in terms of the appended claims.

What is claimed is:

1. A steering system comprising:
   a first tube having a first end and a second end and a first opening positioned between said first end and said second end;
   a second tube having a second opening aligned with said first opening;
   said first tube and said second tube fixedly coupled together at said first opening and said second opening;
   a rack positioned within said first tube;
   a pinion shaft positioned within said second tube;
   a first bushing positioned within said first tube adjacent said first end; and
   a second bushing positioned within said first tube adjacent said second end;
   wherein said first bushing and said second bushing support said rack within said first tube so as to urge and maintain said rack in engagement with said pinion shaft, said first bushing and said second bushing being formed of a compliant material that is intended to dampen forces applied to said rack, said second tube being positioned between said first bushing and said second bushing;
   wherein said second opening of said second tube is sized smaller than said first opening of said first tube so as to allow said first tube to cover said second opening and support said second tube according to a desired orientation;
   wherein at least one of said first tube and said second tube is comprised of a plastic material;
   wherein at least one of said first tube and said second tube has a cross-sectional shape selected from the group consisting of an oval shape, a square shape, and a rectangular shape.

2. A system as recited in claim 1 further comprising a first support positioned on said first tube adjacent to said first bushing.

3. A system as recited in claim 1 further comprising a second support positioned on said first tube adjacent to said second bushing.

4. A system as recited in claim 1 further comprising:
   a first support positioned within said first tube adjacent for supporting said first bushing; and
   a second support positioned within said first tube for supporting said second bushing.

5. A system as recited in claim 4 wherein each of said first support and said second support comprises one selected from the group consisting of a notch and pin fastening pair, a groove, and a clip and step fastening pair;
   wherein said groove receives one of said first bushing and said second bushing that is comprised of an elastic material.

6. A system as recited in claim 1 further comprising an end cap located within said second tube for rotatably receiving said pinion shaft.

7. An automotive vehicle having a support member and a steering system comprising:

a rack housing having a first end and a second end;

a pinion housing aligned with said rack housing;

a rack positioned within said rack housing;

a pinion positioned within said pinion housing;

a first bushing coupled within said rack housing adjacent said first end; and a second bushing positioned within said rack housing adjacent said second end;

wherein said first bushing and said second bushing support said rack within said first tube and so as to urge and maintain said rack in engagement with said pinion, said first bushing and said second bushing comprised of a compliant material that is intended to dampen forces applied to said rack, said second tube being positioned between said first bushing and said second bushing.

8. A system as recited in claim 7 wherein said rack housing comprises a first tube having a first opening positioned between said first end and said second end.

9. A system as recited in claim 8 wherein said pinion housing is a second tube having a second opening aligned with said first opening.

10. A system as recited in claim 9 further comprising an end cap located within said second tube for rotatably receiving said pinion.

11. A system as recited in claim 9 further comprising a first support for coupling said first bushing to said first tube.

12. A system as recited in claim 11 wherein said first support comprises one selected from the group consisting of a notch and pin fastening pair, a groove, and a clip and step fastening pair;

wherein said groove receives one of said first bushing and said bushing that is comprised of an elastic material.

13. A system as recited in claim 9 wherein said first tube and said second tube have a circular cross section.

14. A system as recited in claim 7 wherein at least one of said rack housing and said pinion housing is comprised of a plastic material.

15. A system as recited in claim 7 wherein at least one of said rack housing and said pinion housing has a cross-sectional shape selected from the group consisting of an oval shape, a square shape, and a rectangular shape.

16. A method of forming a steering system comprising the steps of:

cutting a first opening in a first tube between a first end and a second end to expose a first fillet;

cutting a second opening in a second tube to expose a second fillet;

positioning a first bushing within the first end of the first tube;

positioning a second bushing within the second end of the first tube;

positioning the first fillet against the second fillet so that the first tube covers said second fillet and said second tube is positioned between the first bushing ad the second bushing;

fixedly fastening the first fillet and the second fillet;

placing a rack within the first tube;

placing a pinion within the second tube; and aligning the pinion with the rack; and urging the rack in engagement with the pinion.

\* \* \* \* \*